Nov. 22, 1960 W. J. DENNIS 2,961,361
MANUFACTURE OF REINFORCING MATS
Filed March 16, 1956
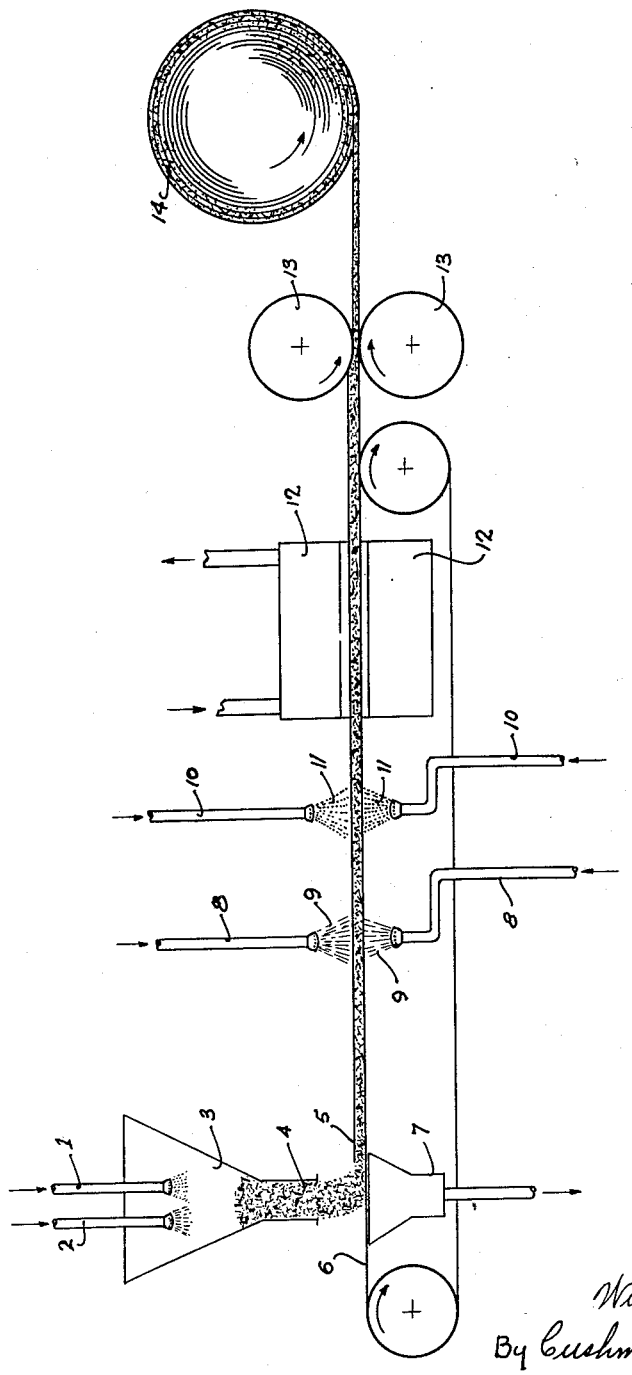
Inventor
William J. Dennis
By Cushman, Darby & Cushman
Attorneys

United States Patent Office 2,961,361
Patented Nov. 22, 1960

2,961,361

MANUFACTURE OF REINFORCING MATS

William J. Dennis, Guelph, Ontario, Canada, assignor to Fiberglas Canada Limited, Toronto, Ontario, Canada Filed Mar. 16, 1956, Ser. No. 571,942

Claims priority, application Canada May 10, 1955

8 Claims. (Cl. 154—101)

This invention relates to the manufacture generally of felted fibrous mats. Such mats find use in many industrial applications, one example of which is as reinforcement in the manufacture of articles moulded from synthetic resinous materials, such as reinforced decorative or structural panels, reinforced trays, reinforced boat hulls, and many other plastic articles of the so-called laminated type. Another use for felted fibrous mats is as electrical, thermal or acoustical insulation.

The mats may be made from any natural or synthetic filiform material capable of being formed into a felted fibrous mat and in particular may be constructed of "mineral wool" which is a term intended to include both glass fibers and fibers made from slags and other glass forming material. In the subsequent description it is proposed to exemplify the invention by reference to mats made from glass fibers, but it is to be understood that the invention is not restricted in its scope to mats made of glass.

It is already known to manufacture mats from glass or other synthetic fibers cut into short lengths and held together by a binding material which may conveniently be a synthetic resin in powdered form. During the course of manufacture, the mat is passed through a heating zone to melt the binder and cause it to act as an adhesive on recooling, thus providing the mat with the necessary degree of cohesion. In addition, it has previously been proposed to spray mats of this character with a bonding agent dissolved in a suitable volatile liquid, so that by evaporation of the liquid the bonding material can be caused to precipitate and adhere to the fibers.

There have been many difficulties inherent in this latter process. The liquid binder was normally a water emulsion and this necessitated emulsifying the binder throughout the liquid, in many cases a difficult and laborious task. There was also a tendency for the emulsion to separate out, resulting often in clogging of the spray nozzles. In addition, when the mat was formed on a conveyor belt, which is the conventional method of forming mats of this type, the liquid spray tended to be deposited on such belt and its ancillary parts, such as the bearings and supporting framework. Such deposits often caused stoppage of the machinery.

Moreover, there was a tendency when employing the finished mat as an element in the subsequent laminating process for the binding material of the mats to be "washed out" by the synthetic material of which the laminated article was being manufactured.

The present invention is directed towards furnishing improvements in the manufacture of felted fibrous mats, that is to say mats made of natural or synthetic filiform material, whether such material be in short lengths, as in the case of staple glass fibers; in continuous lengths, as in the case of glass yarn; or a combination of short and continuous lengths.

The invention provides a method of manufacturing a mat of filiform material which comprises intimately mixing such material and a first dry solid binder, forming such mixture into the form of a mat, spraying at least one surface of said mat with a relatively volatile liquid sufficiently gently to avoid penetration of said liquid into the interior of the mat, so that said relatively volatile liquid lies at said surface of said mat, then spraying said surface of the mat with a second dry solid binder, the presence of said relatively volatile liquid at the surface of the mat serving to minimize penetration of said second dry solid binder into the interior of the mat, thereby producing a higher proportion of binder at said surface than in the interior of the mat, and finally effecting evaporation of said liquid and setting of both said binders to produce a mat having at said surface a surface layer which is more strongly bonded than the interior of the mat. In practice the volatile liquid will normally be water and this water which is sprayed finely over the surface of the mat will itself lie on the filiform material at such surface without penetrating to any substantial extent into the interior of the mat. When the second binder is then sprayed onto the same surface of the mat, it tends to become trapped by the droplets of water which thus act to inhibit any tendency that the second binder may have had to penetrate into the interior of the mat by reason of the movement imparted to it by the spray nozzle.

The two binders may be different materials, but it is equally practicable for the same material to be used as both binders. This material will normally be a synthetic resinous material, although natural resinous materials may be employed.

The accompanying drawing shows diagrammatically a preferred method by which the invention may be carried into practice. A powdered binder is blown through a tube 1 into a conical chamber 3 where it is intimately mixed with short lengths of glass fibers that are blown into such chamber through a tube 2. This intimate mixture of glass fibers and binder is illustrated diagrammatically at 4 in the lower part of the chamber 3, and it will be observed from the drawing how this mixture 4 is deposited as a loosely packed mat 5 on the surface of a moving conveyor belt 6. This is a conventional method of forming a mat of this type, and it is not considered necessary to elaborate further on the details. The formation of the mat may be aided by the use of a suction tube 7 arranged directly beneath the part of the conveyor belt 6 onto which the mixture 4 is blown.

As the mat travels along with the conveyor belt it first passes into a zone in which both sides are subjected to water sprays 9 supplied through tubes 8. These sprays are of a gentle nature and the majority of the water will lie on the outer surfaces of the mat 5 without penetrating into its interior. Shortly after application of the water, both surfaces of the mat are subjected to sprays 11 of a suitable second binder supplied through tubes 10. The water deposited on the outer surfaces of the mat traps the particles of the second binder and thus prevents the majority of it also from penetrating into the interior of the mat, causing such binder to lie on the surfaces.

The mat is then passed through a heating zone represented by an oven 12. In this zone sufficient heat is supplied to the mat to evaporate the water sprayed on, to melt both the first binder supplied through the tube 1 and intimately mixed with the glass fibers and also to melt the second binder 11 which has been deposited solely on the surfaces of the mat. After leaving the heating zone 12 the mat 5 is passed through a pair of hollow water cooled rollers 13 by which it is slightly compressed and the two binders are firmly set. This heating and subsequent cooling has the effect of binding the glass fibers loosely together in the interior of the mat where the concentration of binder is relatively low, thus retaining a relatively soft and pliable texture, while forming a tougher exterior skin of binder extending substantially over the whole of both outer surfaces of the mat where the sprayed-on binder has been deposited. Finally the finished mat is collected on a roller 14.

As already mentioned, it is not essential to employ the same material for both binders, although it will often be convenient to do so. The binder can be of either the heat activatable type or the cold setting type. An example of a heat activatable binder is a polyester resin (a polyester resin known commercially as Laminac 4180 has been found especially suitable): also included in this group are bonding agents such as gelatin which would dissolve to some extent in the surface-applied water and would subsequently effect binding simply through evaporation of the water without undergoing any chemical change. Moreover, the binder may be either thermoplastic or thermosetting. Polyester resins are borderline thermosetting-thermoplastic materials but Laminac 4180 may be considered thermosetting. Once heated, the Laminac 4180 fuses and then sets to a permanently hardened state which cannot be remelted. On the other hand Dacron and Terylene are examples of polyesters that behave as thermoplastic materials in that they can be remelted by heating. The true thermoplastic resins, such as polystyrene resin, may also be employed.

In the cold setting group of binders there are pressure sensitive adhesives which can be rendered effective at room temperature by subsequent compaction of the mat or with only a slight warming of the material in an oven.

In manufacturing felted fibrous mats with glass fibers it has been found convenient to use a polyester resin as the first binder that is intimately mixed with the fibers and to use a polystyrene resin for the second binder that forms the exterior skin.

Another factor that may enter into the decision as to the nature of the binder to be used on the surface of the mat may be whether or not it is desired that the pattern of glass or other fibers constituting the mat be visible in part or in full, or be wholly invisible after the mat has been used in the manufacture of a laminated article. In some cases the decorative effect of the fiber pattern will be desired; in other cases, such as in translucent sheeting, elimination of the fiber pattern will be a necessity. Certain types of polyester resins overcured in the oven have the effect of revealing fiber pattern, while polystyrene resins, being soluble in polyesters, will tend to effect concealment of the pattern.

There are many synthetic resinous materials, as well as natural resinous materials, that may be employed as binders for the invention. It is not deemed necessary to specify further specific examples of such material since the basic novelty of the present invention resides in the sequence of steps whereby binder is applied to the mat in two separate operations to form a comparatively loose interior and a comparatively toughened skin.

In the preferred embodiment of the invention described, the water and binder are sprayed on both the top and bottom surfaces of the mat. If it is desired to have a skin of binder on one side only, then only that side will be sprayed with the binder. It follows that there will then only be a need to spray that same side with the water.

When water is sprayed on to the surface of a mat prior to the application of a second binder, it becomes possible by means of the invention to use as binders agents with normally could not be applied in aqueous or other vehicle form, due to the reactivity of the resins with the activating agents normally incorporated in a resin-vehicle mix. For example it would be convenient to use as a binder a polyester resin dispersed in water which also contained catalysts and hardeners. The useful life of such a mix is very short since polymerization of the resin commences as soon as contact is made with the catalysts and hardeners. It is thus extremely difficult to apply a resin mix of this type by a conventional spraying method. By means of the present invention in its preferred form, the catalysts and hardeners may be incorporated in the water that is initially sprayed on to the mat while the polyester is subsequently applied to the mat in a stable dry state. The method according to the invention may thus have the effect of rendering more practical the use of binders that are particularly sensitive to hardening or that are relatively unstable in solution or dispersed forms. With the separate application of the resin and the agents that act as catalysts and hardeners, agents can be used that will harden the resin very rapidly, thus requiring less subsequent heating for bonding purposes. Moreover, the water can contain colouring agents, wetting agents, or other light and heat stabilizing compounds for the binder which would be useful in providing improvements in the properties of the mat.

I claim:

1. A method of manufacturing a mat of filiform material which comprises intimately mixing such material and a first dry solid binder, forming such mixture into the form of a mat, spraying at least one surface of said mat with a relatively volatile liquid sufficiently gently to avoid penetration of said liquid into the interior of the mat, so that said relatively volatile liquid lies at said surface of said mat, then spraying said surface of the mat with a second dry solid binder, the presence of said relatively volatile liquid at the surface of the mat serving to minimize penetration of said second dry solid binder into the interior of the mat, thereby producing a higher proportion of binder at said surface than in the interior of the mat, and finally effecting evaporation of said liquid and setting of both said binders to produce a mat having at said surface a surface layer which is more strongly bonded than the interior of the mat.

2. The method according to claim 1 wherein evaporation of said relatively volatile liquid and setting of both said binders is effected by passing the mat through a heating zone.

3. A method according to claim 1 wherein an agent adapted to accelerate setting of said second binder is incorporated in the relatively volatile liquid.

4. A method according to claim 1 wherein said filiform material is composed of glass strands.

5. A method as claimed in claim 1 wherein both said binders are resinous materials.

6. A method according to claim 1 in which the first binder is a polyester resin, and the second binder is a polystyrene resin.

7. A method as claimed in claim 1 in which the liquid employed is water.

8. A method as claimed in claim 1 including the final step of passing said mat through a pair of cooled compression rollers.

References Cited in the file of this patent

UNITED STATES PATENTS

| | | |
|---|---|---|
| 1,926,560 | Redman | Sept. 12, 1933 |
| 2,067,012 | Loetscher | Jan. 5, 1937 |
| 2,347,697 | Levey | May 2, 1944 |
| 2,372,433 | Koon | Mar. 27, 1945 |
| 2,373,033 | Kopplin | Apr. 3, 1945 |
| 2,443,197 | Rhodes | June 15, 1948 |
| 2,577,205 | Meyer et al. | Dec. 4, 1951 |
| 2,649,034 | Gramelspacher | Aug. 18, 1953 |
| 2,658,847 | MacDonald | Nov. 10, 1953 |
| 2,671,496 | Chavannes et al. | Mar. 9, 1954 |
| 2,673,370 | Goss | Mar. 30, 1954 |
| 2,698,271 | Clark | Dec. 28, 1954 |
| 2,748,028 | Richardson | May 29, 1956 |
| 2,790,741 | Sonneborn et al. | Apr. 30, 1957 |
| 2,794,760 | Wilson | June 4, 1957 |
| 2,805,181 | Groff et al. | Sept. 3, 1957 |
| 2,816,054 | Howden | Dec. 10, 1957 |